United States Patent [19]

Letterman

[11] 3,797,862

[45] Mar. 19, 1974

[54] PRINTED CIRCUIT BOARD HITCH CONNECTOR

[75] Inventor: Ernest E. Letterman, Warrensburg, Mo.

[73] Assignee: Harmon Industries, Inc., Grain Valley, Mo.

[22] Filed: Mar. 1, 1972

[21] Appl. No.: 230,860

[52] U.S. Cl. ............. 280/422, 339/5 P, 280/423 R
[51] Int. Cl. ............................................. B60d 1/06
[58] Field of Search ............. 280/420, 422; 339/5 P

[56] References Cited
UNITED STATES PATENTS
3,181,887  5/1965  Boylan et al. ...................... 280/422
2,416,802  3/1947  Roung ................................ 339/5 P Primary Examiner—Leo Friaglia
Assistant Examiner—Randall A. Schrecengest
Attorney, Agent, or Firm—D. A. N. Chase

[57] ABSTRACT

A hitch arrangement for coupling a towing vehicle with the tongue of a towed vehicle and for interconnecting the electrical systems of the two vehicles through means which permits relative rotation of the vehicles about the upright axis established by the hitch connection without interrupting electrical continuity. In applications utilizing a ball and socket hitch where the vehicles are capable of unlimited relative rotation, such as a towing vehicle and trailer combination employing a car-top hitch, the hitch ball is supported on a baseplate attached to the top of the towing vehicle. An electrical contact assembly is mounted beneath the hitch ball and comprises a horizontally disposed printed circuit board having a plurality of circular, radially spaced, conductive lands concentric with said axis, and a plurality of electrically conductive wipers engaging corresponding lands. The circuit board is stationary with the baseplate, and a disc that is rotatable about said axis supports the wipers and is closely spaced from the board. A pair of spaced, upstanding ears on the disc receive the tongue of the towed vehicle, thus the disc and wipers move with the towed vehicle as the vehicles undergo relative rotation about said axis. The electrical systems of the towing and towed vehicles are connected by cables with the lands and the wipers respectively. A weatherproof boot encloses the contact structures and the ears.

8 Claims, 7 Drawing Figures

PATENTED MAR 19 1974  3,797,862

PRINTED CIRCUIT BOARD HITCH CONNECTOR

This invention relates to improvements in hitches for interconnecting towing and towed vehicles and, more particularly, to a hitch which effects both the mechanical coupling and electrically interconnects the electrical systems of the towing and towed vehicles.

Towing vehicle and trailer combinations commonly require that the electrical systems of the vehicles be interconnected so that power for the trailer circuits may be supplied by the towing vehicle both continuously and intermittently for control purposes as in braking or operating turn signals. A modern vehicular combination of this type has power requirements necessary for the operation of equipment in the trailer as well as the usual number of control functions for operation of the combination as a whole during movement.

Even present day camping and travel trailers have sufficiently sophisticated electrical systems to necessitate interconnection with the towing vehicle by a multi-conductor cable. When bumper hitches are employed, this is commonly accomplished by a cable extending from the trunk or rear body portion of the towing vehicle with sufficient slack to permit the usual limited relative rotation of the car and the trailer about the axis of the hitch. However, the cable is exposed and is subject to mechanical abuse which naturally reduces the reliability of the connection.

With the development of a car-top hitch and a trailer design complementing the overhead coupling, the use of a slack cable for interconnecting the electrical systems of the two vehicles is particularly disadvantageous due to the unlimited relative rotation of the vehicles which is now permitted and desired. The problem of making electrical connections between two such relatively movable vehicles is compounded by the large number of independent circuits that must be provided, while at the same time it is inherently necessary that any electrical contact arrangement be unsusceptible to mechanical shock and yet significancly compact to not present an obstruction in itself nor constitute an aesthetically unpleasing addition to the hitch assembly.

It is, therefore, the primary object of the present invention to provide apparatus for interconnecting the electrical systems of towing and towed vehicles without placing inherent limitations on the degree of relative rotation of the vehicles about the axis of the hitch connection, and wherein such apparatus is devoid of slack cables and the like subject to mechanical abuse and possible unreliability.

As a corollary to the foregoing object, it is an important aim of this invention to provide apparatus as aforesaid which permits unlimited relative rotation of the towing and towed vehicles about the axis of the hitch connection, in order to facilitate the interconnecting of the electrical systems of vehicular combinations employing car-top hitches or similar structures where completely unrestricted relative movement is desired in order to maximize maneuverability and prevent jackknifing.

Furthermore, it is a specific and important object of this invention to provide apparatus as aforesaid in the form of a unit which is effectively a part of the hitch mount of the towing vehicle, and which is not directly mechanically connected with the trailer so as to minimize the transmission of shock from the trailer to the apparatus and preclude interference with normal hitching and unhitching of the trailer from the towing vehicle.

Figure 1:
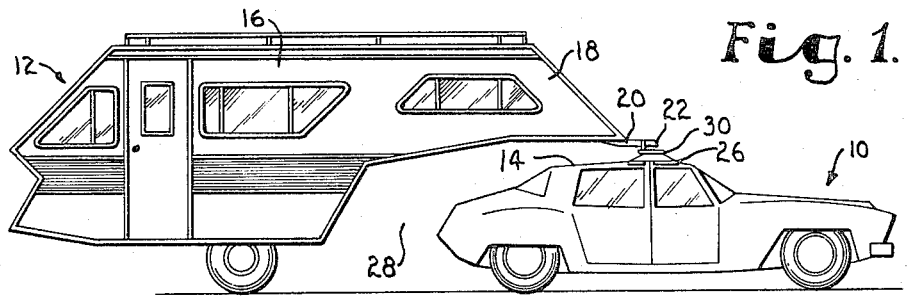
FIG. 1 is a side elevational view of a towing vehicle and trailer combination, showing the mechanical and electrical coupling unit of the present invention in use.
Figure 3:
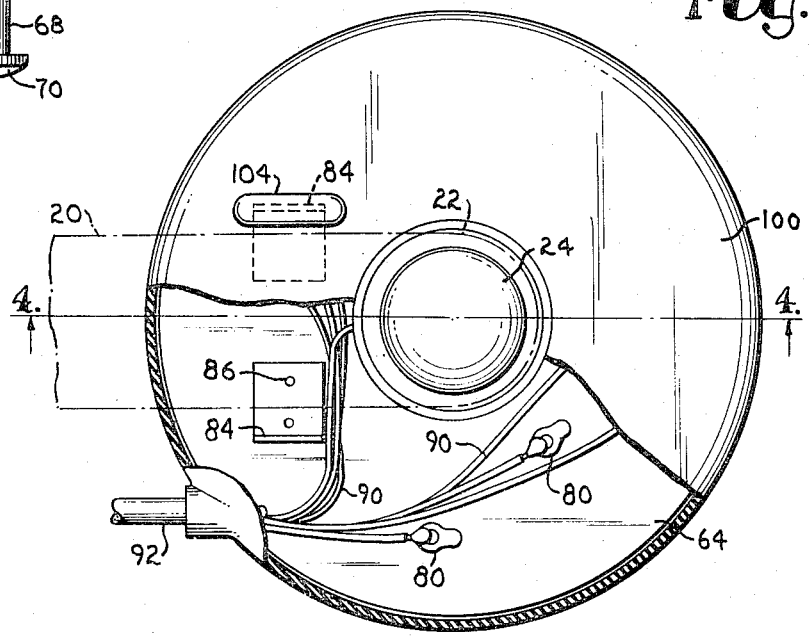
FIG. 3 is a top plan view of the unit alone, a portion of the boot being broken away to reveal the internal construction.

Referring initially to FIG. 1, a conventional four-door sedan is illustrated at 10 and is shown towing a camping trailer 12 which is designed to accommodate a hitching arrangement located on the top 14 of the towing vehicle 10. The trailer 12 has a primary, rear body section 16 and a secondary, front body section 18 which presents a forwardly extending nose that projects over the rear portion of the vehicle 10. A tongue 20 at the forward end of the nose 18 is provided with a split socket 22 which fits over a hitch ball 24 (seen in FIGS. 3 and 4) supported on a mounting member in the form of a baseplate 26 overlying the car top 14 and securely attached thereto. It may be appreciated that the baseplate 26 (and hence the hitch connection) is located midway between the front and rear bumpers of the vehicle 10 and that, therefore, unlimited relative rotation of the two vehicles about the upright axis established by the ball and socket connection is permitted by virtue of the clearance cavity 28 formed beneath the nose 18 in front of the rear section 16 of the trailer 12.

The present invention is illustrated in association with a vehicular combination such as illustrated in FIG. 1, it being understood that the electrical systems of the towing vehicle 10 and the towed vehicle 12 must be interconnected for proper functioning of the combination. For example, modern camping trailers have their own self-contained electrical power system which employs a conventional rechargeable battery and normally includes a charger for recharging the battery when a conventional 110 v. A.C. source is available. However, the trailer battery otherwise relies on the alternator in the towing vehicle 10 for recharging, which is accomplished during highway travel at the time that the alternator is operating in the normal manner to also maintain the car battery in a charged condition. Accordingly, it is necessary to provide a charging circuit between the two vehicles, in addition to the required electrical power connections between the towing vehicle 10 and the trailer running lights, turn signals, brake lights, and backup lights. Furthermore, the trailer 12 would desirably be provided with electric brakes for the trailer wheels operable in synchronism with the brakes in the towing vehicle, thereby requiring an additional electrical circuit between the two vehicles to execute the trailer braking function.

Figure 2:
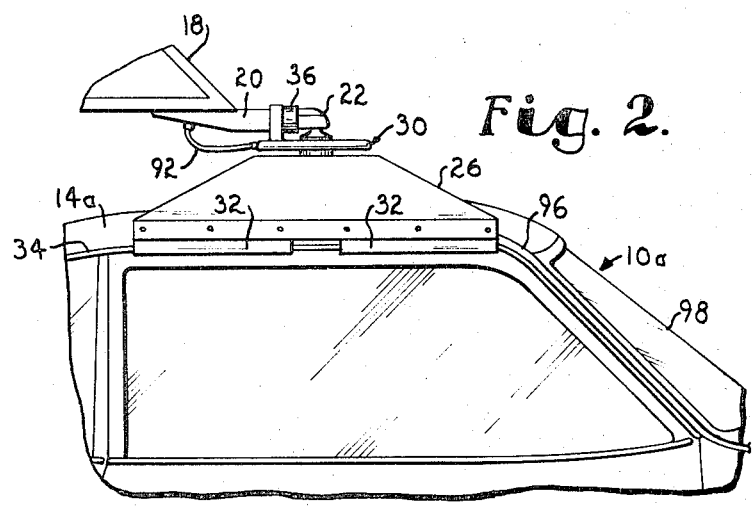
FIG. 2 is a side elevational view showing the unit in greater detail, mounted on the top of an automobile and connected to the tongue of a trailer.

The mechanical and electrical coupling unit 30 of the present invention is illustrated in greater detail in FIG. 2 where the baseplate 26 is shown mounted on the top 14a of a towing vehicle 10a of the two-door type. The baseplate 26 is of generally rectangular configuration as viewed in plan and extends across the top 14a, and is a frustum of a shallow pyramid as viewed in elevation in FIGS. 1 and 2. The baseplate 26 is securely attached to the vehicle 10a by front and rear plate members 32 on both sides of the plate 26. The members 32 are configured to hook over the gutter or edge molding 34 of the top 14a and extend into engagement with the body of the vehicle therebeneath, rows of sheet metal screws (not shown) being employed to fasten the members 32 to the vehicle body. For further information on hitch structures of this general type that provide for unlimited relative rotation of towing and towed vehicles, reference may be had to the copending application of Harry L. Taylor, "Stabilized Towing Vehicle And Trailer Combination And Interconnecting Hitch," Ser. No. 216,551, filed Jan. 10, 1972.

The split socket 22 on the end of the tongue 20 is a conventional releasable hitch socket and is locked closed by a spring-loaded sleeve 36 to form a positive connection with the ball 24. As is particularly clear in FIG. 4, the hitch ball 24 is integrally formed with a tapered base 38 from which a threaded stud 40 depends. The base 38 is supported on a spacer 42 which is in overlying engagement with a stand-off 44 of stepped configuration. The standoff 44 may be integrally cast with the baseplate 26, and both the standoff 44 and the overlying spacer 42 present a fixed hub assembly having central openings receiving the stud 40 which extends downwardly therethrough and through an opening 46 in the baseplate 26. A washer 48 and nuts 50 secure the ball 24 rigidly in place on the baseplate 26 atop the standoff 44 and the spacer 42.

Since the hitch ball 24 is elevated somewhat above the baseplate 26 as just described, space is provided for the coupling unit 30 over the baseplate 26 and beneath the ball 24. The unit 30 includes a disc-shaped printed circuit board 52 having a circular aperture 54 at its center sized to fit over the upper, lesser diameter portion of the standoff 44. Accordingly, the inner circular margin of the board 52 rests on the annular edge provided by the lower, greater diameter portion of the standoff 44. The board 52 is maintained stationary with the standoff 44 (and hence the baseplate 26) by three screws 56 which extend through the board 52 adjacent the aperture 54 and are threaded into the lower portion of the standoff 44. As will be discussed more fully hereinafter, the upper surface of the board 52 is provided with eight circular, concentric lands 58, connections being made thereto from the underside of the board 52 by eight pins 60 that extend upwardly through holes in the board and are soldered to respective lands 58 as seen at 62.

Figure 7:
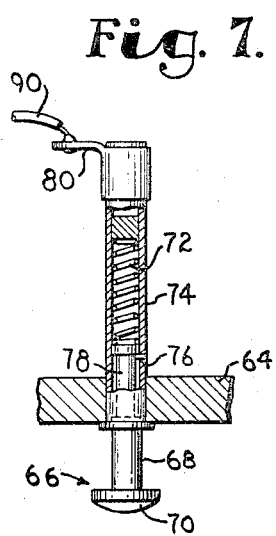
FIG. 7 is a detail showing one of the spring-loaded contact pins.
Figure 5:
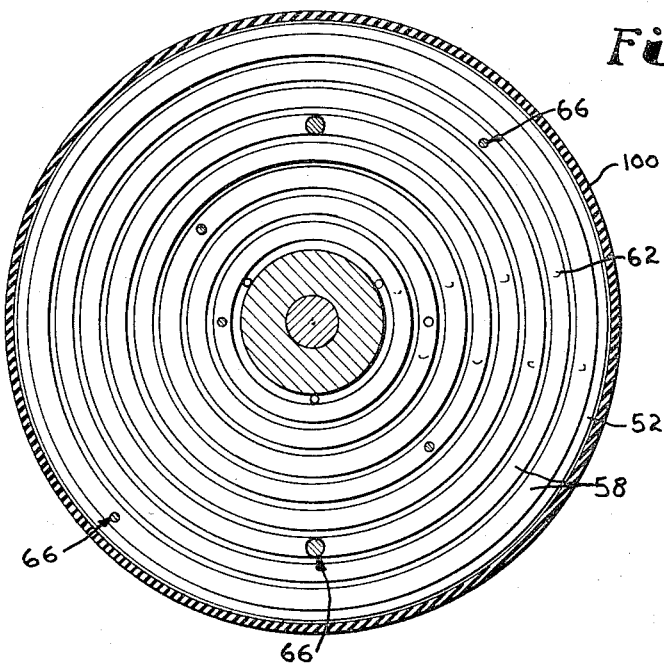
FIG. 5 is a horizontal sectional view of the unit of FIG. 3, looking downwardly and taken in a plane identified by the line 5—5 in FIG. 4.
Figure 6:
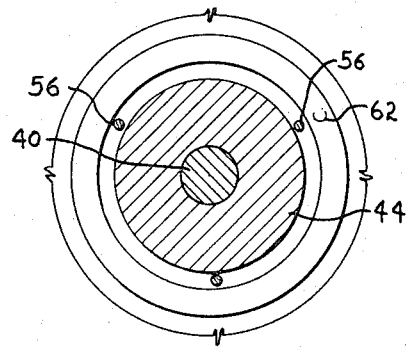
FIG. 6 is an enlarged detail view of the central portion of the printed circuit board shown in FIG. 5.
Figure 4:
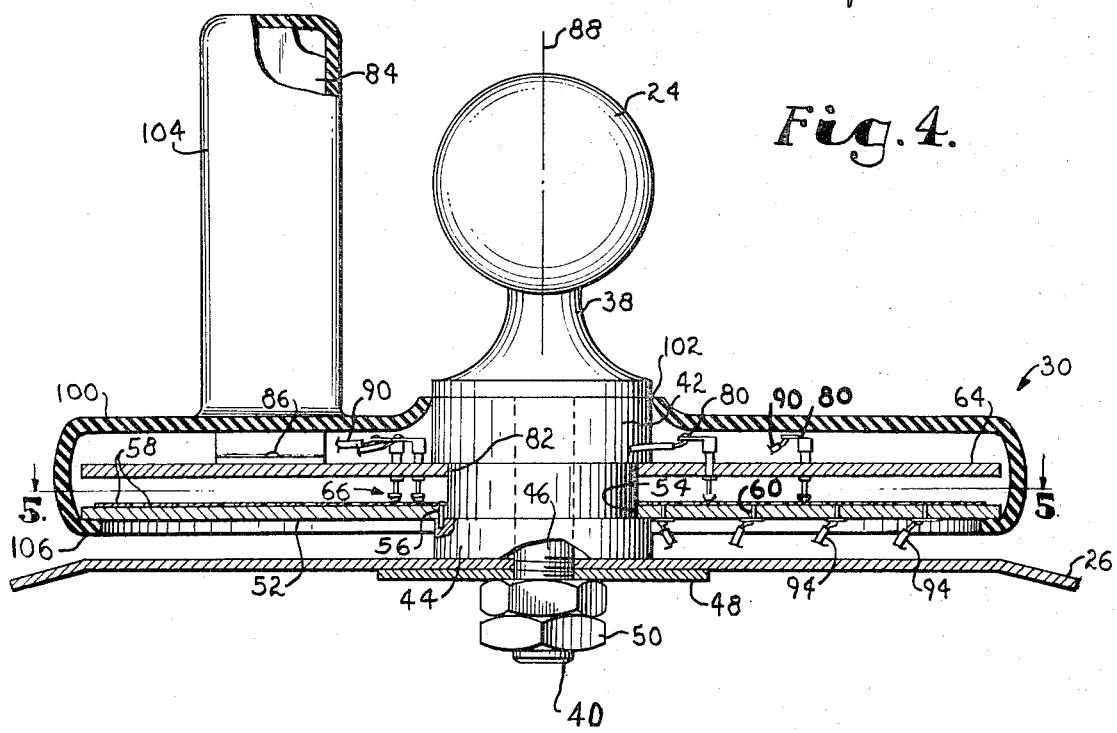
FIG. 4 is a vertical sectional view taken along line 4—4 of FIG. 3 and on an enlarged scale, certain parts being shown in elevation for clarity.

A plate member in the form of a disc 64 of insulating material is parallel to the printed circuit board 52 and is closely spaced thereabove, as is evident in FIG. 4. The disc 64 serves as a support for eight electrically conductive wipers 66 which are held in engagement with corresponding lands 58. The pattern of the eight wipers 66 may be seen in FIG. 5, it being noted that the wipers 66 are angularly spaced from one another to distribute the contact pressure. One of the wipers 66 is shown in detail in FIG. 7, and comprises a contact pin 68 having a head 70 for engaging the land 58, the pin 68 being in the nature of a reciprocating plunger that is biased by a coil spring 72 housed within a barrel 74 from which the pin 68 projects. A stop 76 in the barrel wall is received within a portion 78 of the pin of reduced diameter, thereby preventing withdrawal of the pin 68 from the barrel 74. A soldering lug 80 is secured to the upper end of the barrel 74 so that an electrical connection may be made. In FIG. 7 the pin 68 is shown in its fully extended position, but in practice the spacing between the disc 64 and the printed circuit board 52 would be such that the pin 68 is partially withdrawn against the action of the spring 72 to maintain yieldable contact pressure on the land 58 in underlying engagement with the head 70.

It may be seen in FIG. 4 that the diameter of the spacer 42 is greater than the diameter of the upper portion of the standoff 44, and that the disc 64 has a central aperture 82 of approximately the same diameter as such upper portion, permitting the disc 64 to slip over the standoff 44 and be freely rotatable thereon while held against upward displacement by the spacer 42. Accordingly, the disc 64 is held in the position illustrated in FIG. 4 by the various springs 72 forming a part of the wipers 66. It may be seen in FIG. 5 that the annular spacing of the wipers 66 is such as to form a spiral pattern to provide even support for the rotatable disc 64 carrying the wipers 66 and, more importantly, provide the equal distribution of contact pressure mentioned hereinabove. It may be noted in FIG. 5 (where the wipers 66 are represented by the outlines of their heads) that the wipers 66 engaging the third and fourth lands 58 from the outside are of larger diameter, indicating that one of the circuits and its return is utilized to handle significantly heavier currents than the other circuits, as would be the case, for example, with the charging circuit between the vehicles for charging the trailer battery.

A pair of spaced, upstanding ears 84 are formed by a pair of L-shaped members secured to the disc 64 by rivets 86. As may be seen in FIGS. 3 and 4, the ears 84 project upwardly somewhat above the hitch ball 24 and are positioned to receive the tongue 20 of the trailer 12 when the socket 22 is over the ball 24. Accordingly, as the trailer tongue 20 swings about the upright axis 88 defined by the hitch ball 24 and its mating socket 22, the disc 64 is caused to rotate about the axis 88 since the tongue 20 is captured between the ears 84.

In order to connect the eight wipers 66 with the electrical system of the trailer 12, the ends of eight insulated wires 90 are soldered to the lugs 80 and are formed into a short length of multi-conductor cable 92 which extends rearwardly from the unit 30 to a suitable plug-in receptacle (not shown) on the trailer body adjacent the tongue 20. Similarly, the ends of eight insulated wires 94 are connected to the pins 60 on the underside of the printed circuit board 52, and are united to form a multi-conductor cable 96 which connects with the electrical system of the vehicle 10a. For purposes of illustration, the cable 96 (after passing through the top of the baseplate 26) is shown in FIG. 2 emerging from beneath the forward edge of the baseplate 26 adjacent the edge molding 34 and continuing down the edge of the windshield 98 where the cable 96 would ultimately be interconnected with the electrical system under the hood of the vehicle. It should be understood, however, that a tubular casing through which the cable 96 would be threaded may be provided on the vehicle body at the edge of the windshield 98 both to protect the cable and conceal it from view so as not to impair the appearance of the windshield and door line.

The unit 30 is protected at all times by a weatherproof boot 100 of rubber or flexible plastic material which fits over the disc 64 and the ears 84, and is provided with a central opening 102 which permits the boot 100 to slip over the hitch ball 24 and its base 38. It may be noted that the boot 100 has a disc-shaped configuration conforming to the disc 64 and the printed circuit board 52, but that the boot is molded with hollow, upstanding projections 104 that complementally receive the ears 84. Thus the rubber covering on the guide ears 84 protects the finish of the tongue 20 from damage during operation of the unit. The underside of the boot 100 terminates in an inwardly projecting, annular lip 106 that fits beneath the outer, circumferential margin of the printed circuit board 52.

CONSTRUCTION AND OPERATION

Special consideration is given to the construction of the printed circuit board 52. The employment of printed circuit techniques in the present invention imparts both structural strength and compactness to the unit 30 even with the large number of circuits provided (eight independent current paths in the illustrated embodiment). However, the printed circuit board 52 is of special construction in order to provide the requisite mechanical strength.

Representative specifications for the printed circuit board are as follows. Preferably, a glass fiber board impregnated with epoxy is used having a thickness of ⅛ of an inch. The glass-epoxy substance of such thickness provides a strong, rigid board, and may also be used to form the disc 64 that carries the wipers 66. For the circuit board 52, the composite board is formed by laminating sheets of epoxy impregnated glass cloth faced with copper foil on one side having a thickness on the order of 0.003 inch. The copper foil is then etched to leave the eight concentric lands 58, thereby forming eight continuous conductive leads on the board that serve as tracks for the wipers 66. It is preferred that the copper foil be nickel plated to improve the wear life and minimize oxidation of the conductive surface. Manifestly, in employing a glass-epoxy laminated board for the disc 64, the laminate is formed without the copper foil.

In operation with the ears 84 in the position illustrated in the Figures, it is apparent that the hitch 22-24 may be coupled or uncoupled at will in the usual manner without any interference from the unit 30. Although the ears 84 cause the disc 64 to rotate with the tongue 20, the absence of any direct mechanical connection to the trailer 12 renders the unit 30 independent of the trailer both for convenience in hitching and to minimzie the transfer of mechanical shock from the trailer to the unit.

It may also be noted that the unit 30 in no way limits the relative rotation of the two vehicles about the upright axis 88 established by the hitch ball 24. The towing vehicle 10 or 10a may be maneuvered through an annular displacement of greater than 360° without interruption in the electrical continuity between the cables 92 and 96. Each of the wipers 66 and its underlying land 58 concentric with the axis 88 effectively forms a pair of electrical contact elements, one of which is movable while the other is stationary. Accordingly, continuity between each of the wires 94 of the cable 96 and a corresponding wire 90 of the cable 92 is traced through the connecting pin 60, the land 58, the wiper 66 in engagement therewith, and the lug 80 of such wiper 66 to which the wire 90 is connected. The arrangement readily lends itself to flexibility in the number of independent current paths provided merely by changing the diameter of the printed circuit board 52 or the widths of the lands 58 to provide the needed circuit capacity. This flexibility is further enhanced since each of the wipers 66 is an independent spring contact, thus construction is also simplified as no overall pressure member is required and the wipers may be conveniently positioned in patterns as dictated by the circuit capacity. Furthermore, in applications where the hitch coupling does not permit 360° of relative rotation, the lands 58 may take the form of concentric arcs of appropriate angular sweep rather than full circles as illustrated herein.

Besides having high mechanical strength as discussed above and being a sealed unit impervious to weather, it may be noted that the unit 30 is a permanent part of the hitch mount and hitch ball 24 so that no disassembly is required when it is desired to remove the baseplate 26 from the top of the car. Accordingly, since the unit 30 is never disassembled in normal use, the further possibility of it being subjected to physical abuse or unnecessary exposure is precluded.

Having thus described the invention what is claimed as new and desired to be secured by Letters Patent is:

1. A unit for coupling a towing vehicle with the tongue of a towed vehicle and for interconnecting the electrical systems of the vehicles, said unit comprising:

a mounting member adapted to be secured to said towing vehicle;

a hitch component supported on said member thereabove and adapted for coupling with a mating hitch part carried by the tongue of said towed vehicle, said hitch component establishing an upright axis about which the towing and towed vehicles are capable of relative rotation when said hitch part is coupled with said hitch component;

first and second electrical contact structures beneath said hitch component between the latter and said member, said first structure comprising a printed circuit board extending outwardly from said axis and disposed in a plane transverse thereto, said board being provided with a plurality of arcuate, radially spaced, conductive leads concentric with said axis, said second structure comprising a plurality of electrically conductive wipers, and means supporting said wipers in dispositions engaging corresponding leads;

means mounting one of said structures for rotation about said axis, and securing the other of said structures stationary to said member;

means for electrically connecting said one structure with the electrical system of said towed vehicle;

means for electrically connecting said other structure with the electrical system of said towing vehicle; and means on said one structure for mechanically coupling the same with the tongue of said towed vehicle for movement therewith as said vehicles undergo relative rotation about said axis, including a pair of spaced, upstanding ears on said one structure for receiving said tongue therebetween.

2. A unit for coupling a towing vehicle with a towed vehicle and for interconnecting the electrical systems of the vehicles, said unit comprising:

a mounting member adapted to be secured to one of said vehicles;

a hitch component supported on said member and adapted for coupling with a mating hitch part carried by the other of said vehicles, said hitch component establishing an upright axis about which the towing and towed vehicles are capable of relative rotation when said hitch part is coupled with said hitch component;

a fixed hub mounted on said member coaxial with said hitch component, said hub projecting outwardly from said member along said axis and spacing said hitch component from said member;

first and second electrical contact devices between said hitch component and said member, said first device comprising a first plate structure retained on said hub extending outwardly from said axis and disposed in a plane transverse thereto, said structure supporting a plurality of arcuate, radially spaced, conductive elements concentric with said axis, said second device comprising a second plate structure retained on said hub and supporting a plurality of electrically conductive wipers in dispositions engaging corresponding elements;

means securing the plate structure of one of said devices stationary to said hub, the plate structure of the other of said devices being rotatable thereon;

means for electrically connecting said one device with the electrical system of said one vehicle;

means for electrically connecting said other device with the electrical system of said other vehicle; and means connected with said rotatable plate structure of said other device for mechanically coupling the same with said other vehicle for movement therewith as said vehicles undergo relative rotation about said axis.

3. The unit as claimed in claim 2, wherein said one vehicle is the towing vehicle and said other vehicle is the towed vehicle, said mounting member comprising a baseplate adapted to be secured to the top of the towing vehicle, said hitch component being supported on said member thereabove, and wherein said elements are circular and concentric to permit unlimited relative rotation of said vehicles about said axis without interrupting electrical continuity between said systems.

4. The unit as claimed in claim 2, wherein a protective cover is provided between said hitch component and said member receiving said devices, said cover being rotatable about said axis with said rotatable plate structure and having a central opening through which said hub projects toward said hitch component.

5. The unit as claimed in claim 2, wherein said elements are circular and concentric to permit unlimited relative rotation of said vehicles about said axis without interrupting electrical continuity between said systems.

6. The unit as claimed in claim 2, wherein said first plate structure comprises a printed circuit board provided with a plurality of conductive leads presenting said elements, and wherein said second plate structure extends outwardly from said axis in closely spaced, generally parallel relationship with said board.

7. The unit as claimed in claim 6, wherein each of said wipers comprises an independently spring-biased contact in yieldable, pressure engagement with the corresponding lead.

8. The unit as claimed in claim 6, wherein each of said wipers comprises an independently spring-biased contact in yieldable, pressure engagement with the corresponding lead, said wipers being angularly spaced from one another about said axis to distribute the pressure applied to said leads.

* * * * *